United States Patent
Miyamura

(10) Patent No.: US 8,310,732 B2
(45) Date of Patent: Nov. 13, 2012

(54) IMAGE PROCESSING DEVICE, SYSTEM AND METHOD

(75) Inventor: Norihide Miyamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 773 days.

(21) Appl. No.: 12/379,620

(22) Filed: Feb. 26, 2009

(65) Prior Publication Data

US 2009/0213439 A1    Aug. 27, 2009

(30) Foreign Application Priority Data

Feb. 27, 2008   (JP) .................. 2008-046007

(51) Int. Cl.
*H04N 1/04* (2006.01)

(52) U.S. Cl. ........ 358/474; 382/162; 382/164; 382/165; 382/272; 345/173

(58) Field of Classification Search .................. 358/474; 382/164, 272, 162, 163, 165; 345/173
See application file for complete search history.

(56) References Cited

U.S. PATENT DOCUMENTS

| | | | | | |
|---|---|---|---|---|---|
| 5,926,579 | A | * | 7/1999 | Uejo et al. | 382/272 |
| 6,035,058 | A | * | 3/2000 | Savakis et al. | 382/163 |
| 6,069,618 | A | * | 5/2000 | Ogo | 345/173 |
| 2002/0008715 | A1 | * | 1/2002 | Sorek et al. | 345/698 |
| 2008/0056564 | A1 | * | 3/2008 | Lindbloom | 382/162 |

FOREIGN PATENT DOCUMENTS

JP     A-H06-046255     2/1994

* cited by examiner

*Primary Examiner* — Marivelisse Santiago Cordero
*Assistant Examiner* — Moustapha Diaby
(74) *Attorney, Agent, or Firm* — Posz Law Group, PLC

(57) ABSTRACT

An image processing device includes a displaying unit that reads and displays an image; a base color region designator that designates a base color region of the image displayed on the displaying unit; a non-base color region designator that designates a non-base color region of the image displayed on the displaying unit; and a base eliminator that executes a base elimination of the image based on the base color region designated by the base color region designator and the non-base color region designated by the non-base color region designator.

18 Claims, 12 Drawing Sheets

IMAGE PROCESSING DEVICE, SYSTEM AND METHOD

CROSS REFERENCE TO RELATED APPLICATION

The present application is related to, claims priority from, and incorporates by reference Japanese Patent Application No. 2008-046007, filed on Feb. 27, 2008.

TECHNICAL FIELD

The present invention relates to an image processing device that eliminates the base color of a manuscript. Also, the invention relates to an image processing system and method including the image processing device.

BACKGROUND

One common approach to eliminate a base color of a manuscript in an image processing device is to determine a threshold value of luminance and replace pixels of more than the threshold value with white ones. The threshold value used for base elimination can be set to be a value at which the lowest luminance base color is not reproduced. However, when the threshold value is set too low, a high luminance portion of the image in the original manuscript may also be replaced with white. Japanese laid-open patent application H06-46255 discloses an image processing device that is configured to be regulated manually so that a user can freely change a threshold value relative to an average luminance value of a base value detected in an image data.

However, such manual regulation is difficult for the user when there is a color image region on the manuscript similar to a color of the base. The present disclosure includes following configurations so as to alleviate the problem mentioned above.

SUMMARY

The disclosed system and method can provide an image processing device including a displaying unit that reads and displays an image; a base color region designator that designates a base color region of the image displayed on the displaying unit; a non-base color region designator that designates a non-base color region of the image displayed on the displaying unit; and a base eliminator that executes a base elimination of the image based on the base color region designated by the base color region designator and the non-base color region designated by the non-base color region designator.

With the disclosed system and method, it is realized that an image processing device can set a base color region (BCR) and a non-base color region (NCR) of a manuscript, and can reproduce a manuscript image part while eliminating the BCR of the manuscript after correcting luminance for all region of the manuscript image using a base elimination threshold (BET) value when a valid BET value is calculated. On the other hand, the image processing device can calculate a hue value, a saturation value, and a luminance value of a pixel in the NCR when the valid BET value is not calculated in the BCR and NCR, and excludes similar pixels from a base elimination processing by judging them as the manuscript image parts.

DETAILED DESCRIPTION

Various embodiments are described below with reference to the drawings.

Figure 1:
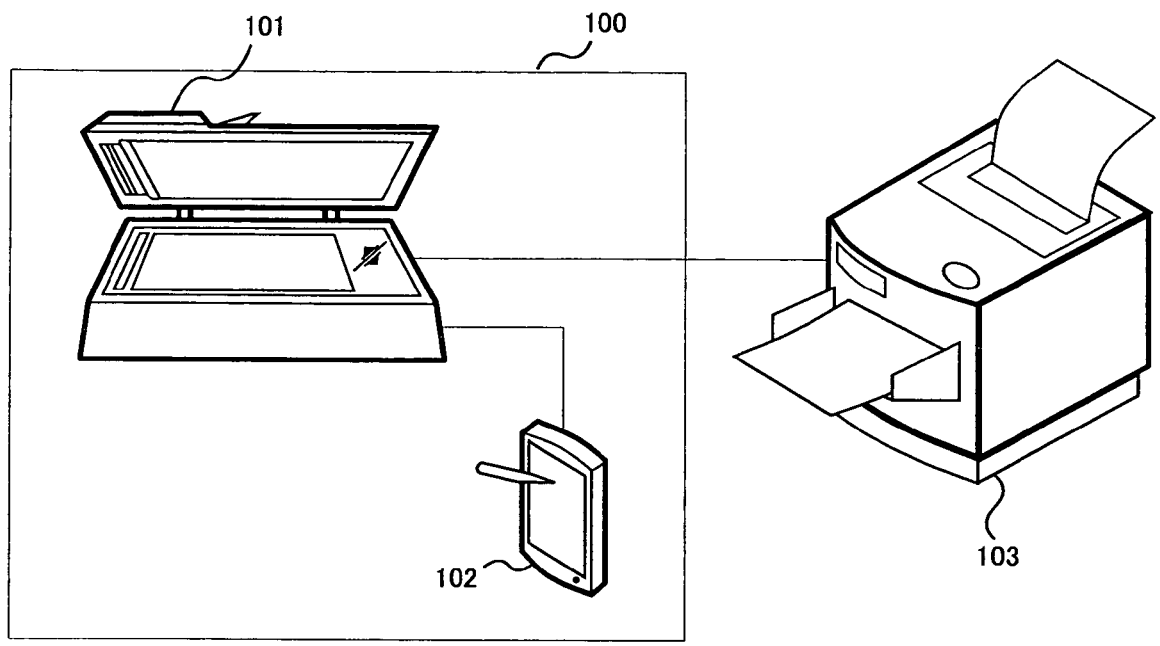
FIG. 1 is a diagram showing a configuration of the image processing device according to disclosed embodiments.

FIG. 1 is an explanatory diagram of a configuration showing an embodiment of the image processing device according to disclosed embodiments. As shown by FIG. 1, an image processing device 100 includes a scanner 101 and an operation panel 102. The operation panel 102 can receive an input, for example, via a liquid crystal display (LCD) touch pen, and has a function to display a read image. The image processing device 100 can be connected to the printer 103 via a network.

First Disclosed Embodiment

Figure 2:
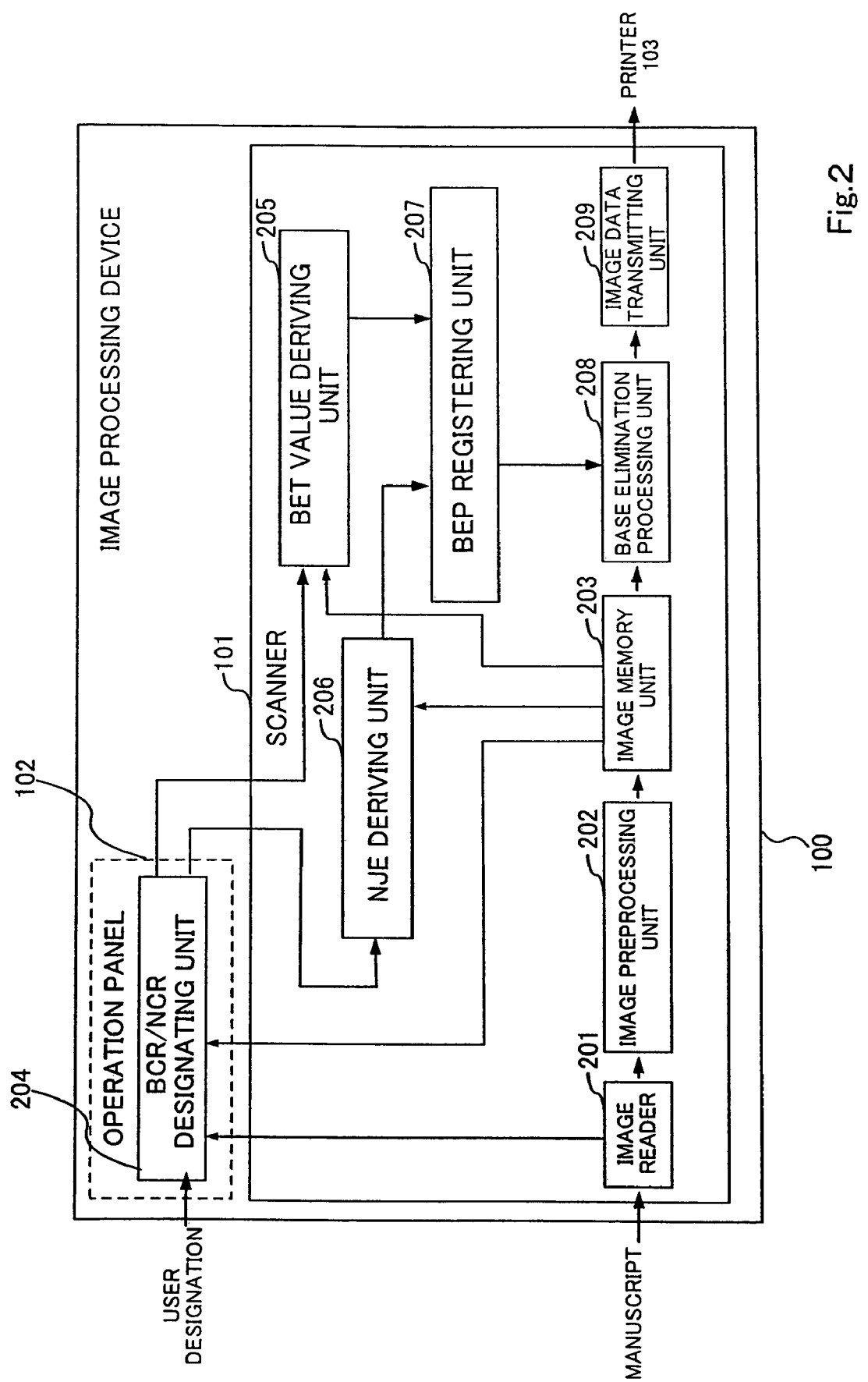
FIG. 2 is a block diagram showing a configuration of an image processing device according to a first disclosed embodiment.

Next, a configuration of the image processing device 100 according to a first disclosed embodiment is explained. FIG. 2 is a block diagram showing a configuration of an image processing device according to a first embodiment. As shown in FIG. 2, the scanner 101 includes an image reader 201, an image preprocessing unit 202, an image memory unit 203, a base elimination threshold (BET) value deriving unit 205, a non-base judging equation (NJE) deriving unit 206, a base elimination parameter (BEP) registering unit 207, a base elimination processing unit 208, and an image data transmitting unit 209. The operation panel 102 includes a base color region (BCR)/non-base color region (NCR) designating unit 204.

The image reader 201 operates to read a manuscript (i.e., an image), to convert it into image data after reading it, and to provide the image data to the image preprocessing unit 202. In addition, when the conversion to the image data is completed, the image reader 201 operates to inform this effect to the BCR/NCR designating unit 204 on the operation panel 102.

The image preprocessing unit 202 performs preprocessing operations on the image data of the manuscript received from the image reader 201, and provides preprocessed image data to the image memory unit 203. In various embodiments, the preprocessing can include operations such as noise removal, smoothing, and color converting.

The image memory unit 203 stores the preprocessed image data received from the image preprocessing unit 202 as stored image data. The image memory unit 203 then provides the stored image data to the BCR/NCR designating unit 204, the BET value deriving unit 205, the NJE deriving unit 206, and the base elimination processing unit 208.

The BCR/NCR designating unit 204 displays the image data provided from the image memory unit 203 on the operation panel 102. The user can then designate the BCR and NCR on the operation panel 102. In addition, the BCR/NCR designating unit 204 provides positional information of the BCR and NCR designated within the image data to the BET value deriving unit 205 and the NJE deriving unit 206.

The BET value deriving unit 205 determines luminance values for all of the pixels in the BCR and the NCR, to calculate a luminance frequency distribution, and to calculate a BET value from the distribution value. The BET value deriving unit 205 provides the calculated BET value to the BEP registering unit 207.

The NJE deriving unit 206 derives an NJE from color information (e.g., hue, saturation, and luminance) of all pixels in the designated NCR so as to judge a non-base pixel. The NJE deriving unit 206 then provides the calculated NJE to the BEP registering unit 207.

The BEP registering unit 207 registers BEPs (i.e., the BET value and the NJE) calculated at the BET value deriving unit 205 and the NJE deriving unit 206. The BEP registering unit 207 provides the registered BEPs to the base elimination processing unit 208.

The base elimination processing unit 208 executes a base elimination processing for the image data provided from the image memory unit 203 using the BEPs provided from the BEP registering unit 207. The base elimination processing unit 208 then provides the base-eliminated image data to the image data transmitting unit 209.

The image data transmitting unit 209 transmits the base-eliminated image data provided from the base elimination processing unit 208 to the printer 103.

Figure 3:
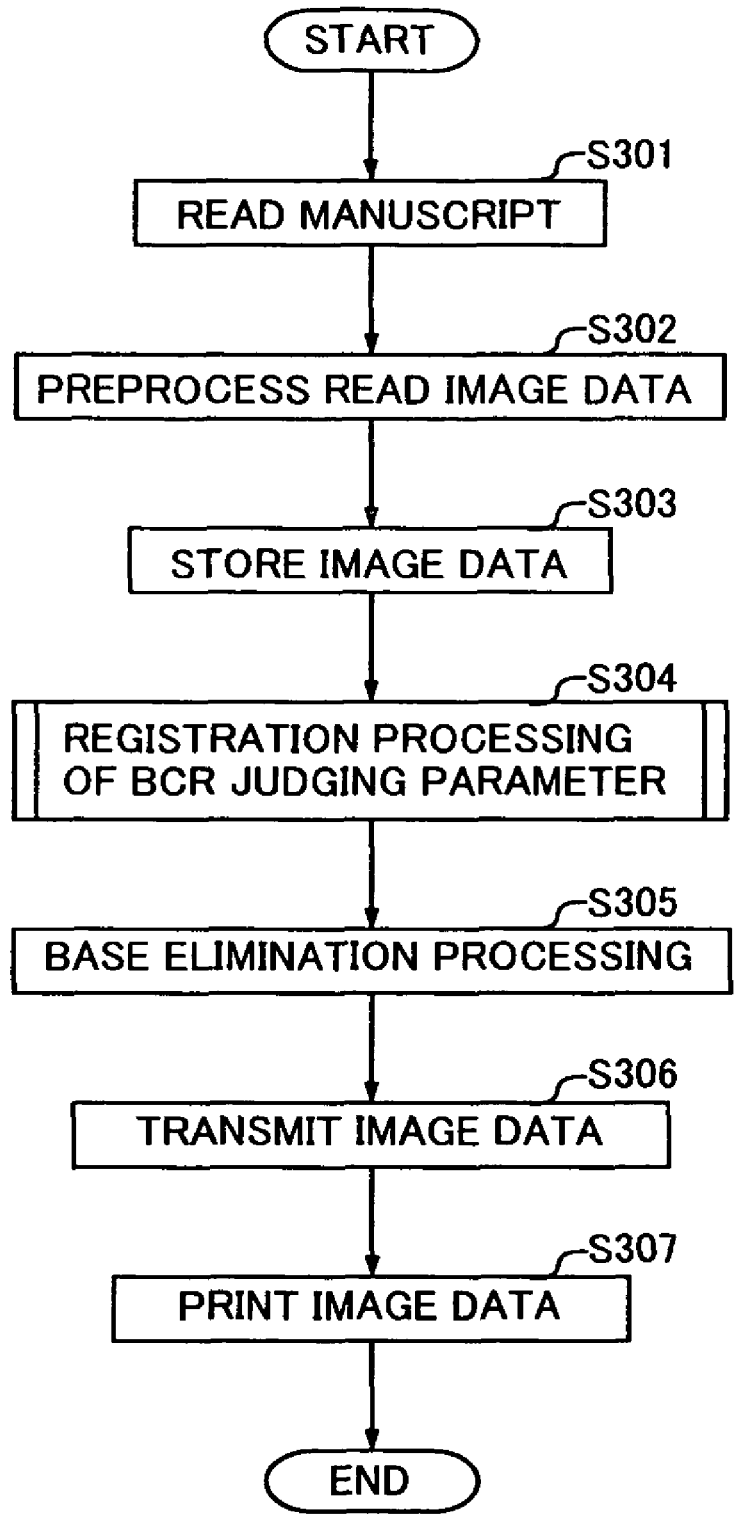
FIG. 3 is a flow diagram showing a processing flow according to the first disclosed embodiment.
Figure 4:
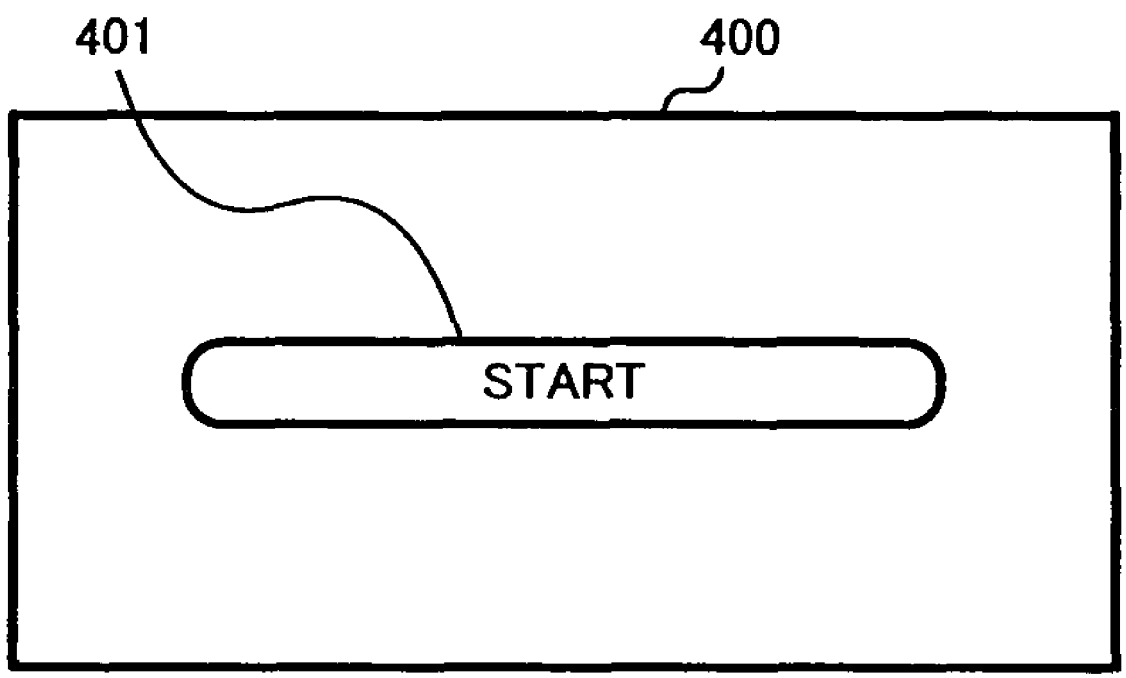
FIG. 4 is an explanatory diagram of a user interface screen of the operation panel according to disclosed embodiments.

Next, a performance of the first disclosed embodiment is described. FIG. 3 is a flow diagram showing a processing flow according to the first disclosed embodiment; and FIG. 4 is an explanatory diagram of a user interface screen of the operation panel according to disclosed embodiments.

(S301) As shown in FIG. 3, the image reader 201 reads an image from a manuscript, converts it to an image data, and provides the image data to the image preprocessing unit 202. In an embodiment in accordance with FIG. 4, this can be performed after a user sets the manuscript into the scanner 101, and holds down a start button 401 of the operation panel 102.

(S302) The image preprocessing unit the 202 performs preprocessing, such as noise removal, smoothing, and color conversion, for the provided image data. In addition, the color information (e.g., a hue value H; a saturation value S, and a luminance value L) used by a base elimination in the present invention are detected from the image data that has completed preprocessing.

(S303) When the preprocessing of the image data is completed, the image preprocessing unit 202 provides the image data to the image memory unit 203, and the image memory unit 203 stores the image data.

(S304) Next, registration processing of the BCR judging parameter is performed. In the disclosed embodiment, this is done by having the image memory unit 203 provide the stored image data to the BCR/NCR designating unit 204, the BET value deriving unit 205, the NJE deriving unit 206, and the base elimination processing unit 208.

The BEPs are then calculated by the BCR/NCR designating unit 204, the BET value deriving unit 205, and the NJE deriving unit 206 that receive the image data, and are registered at the BEP registering unit 207. After that, the BEP registering unit 207 provides the registered BEPs to the base elimination processing unit 208 (See, e.g., the flow diagram of FIG. 5, below.)

(S305) The base elimination processing unit 208 then executes the base elimination processing for pixels in the whole region of the image by using the provided BEPs. (See, e.g., the flow diagram of FIG. 7 below.)

(S306) After the base elimination processing for the pixels in the whole region of the image, the image data is transmitted. In the disclosed first embodiment, this is performed by having the base elimination processing unit 208 provide the image data to the image data transmitting unit 209. The image data transmitting unit 209 then converts the provided image data to a data format that the printer 103 can process, and transmits the converted image data to the printer 103.

(S307) The printer 103 that receives the image data, now converted into a data format that can be processed, then starts printing the image.

Figure 5:
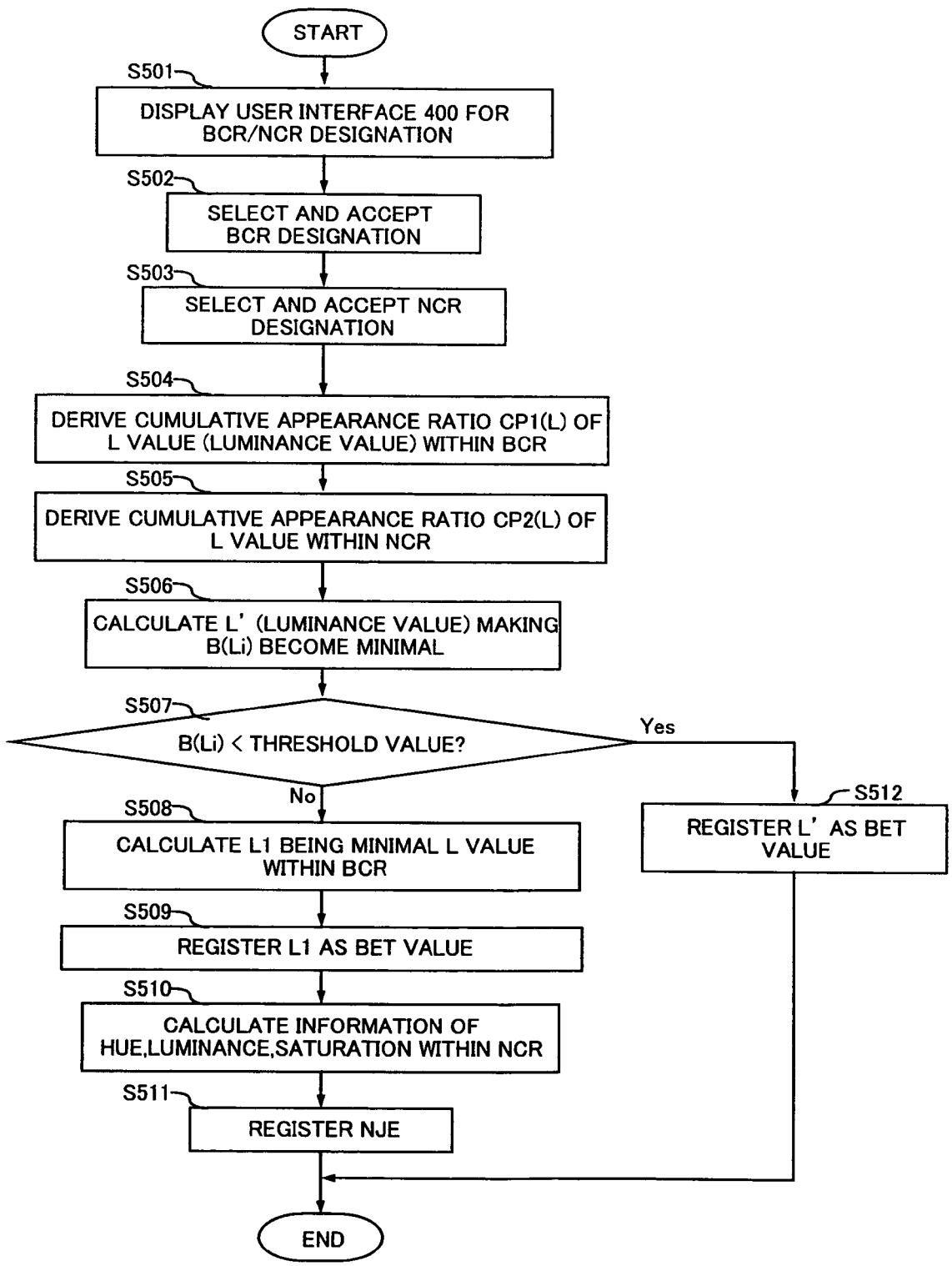
FIG. 5 is a flow diagram showing a processing flow of base elimination parameter (BEP) registration according to the first disclosed embodiment.

Following this, an example of the registration processing of a BEP at S304 of the flow diagram in FIG. 3 is described in detail with respect to FIG. 5. FIG. 5 is a flow diagram showing a processing flow of BEP registration in the embodiment 1. Steps from S501 to S512 are described in order of the steps according to the flow diagram shown in the figure by using FIG. 1.

(S501) As shown in FIG. 5, the image data, which has been preprocessed by the image preprocessing unit 202 and stored in the image memory unit 203, is first provided to the BCR/NCR designating unit 204 in the operation panel 102, and is displayed on a screen of a user interface 400.

Figure 6:
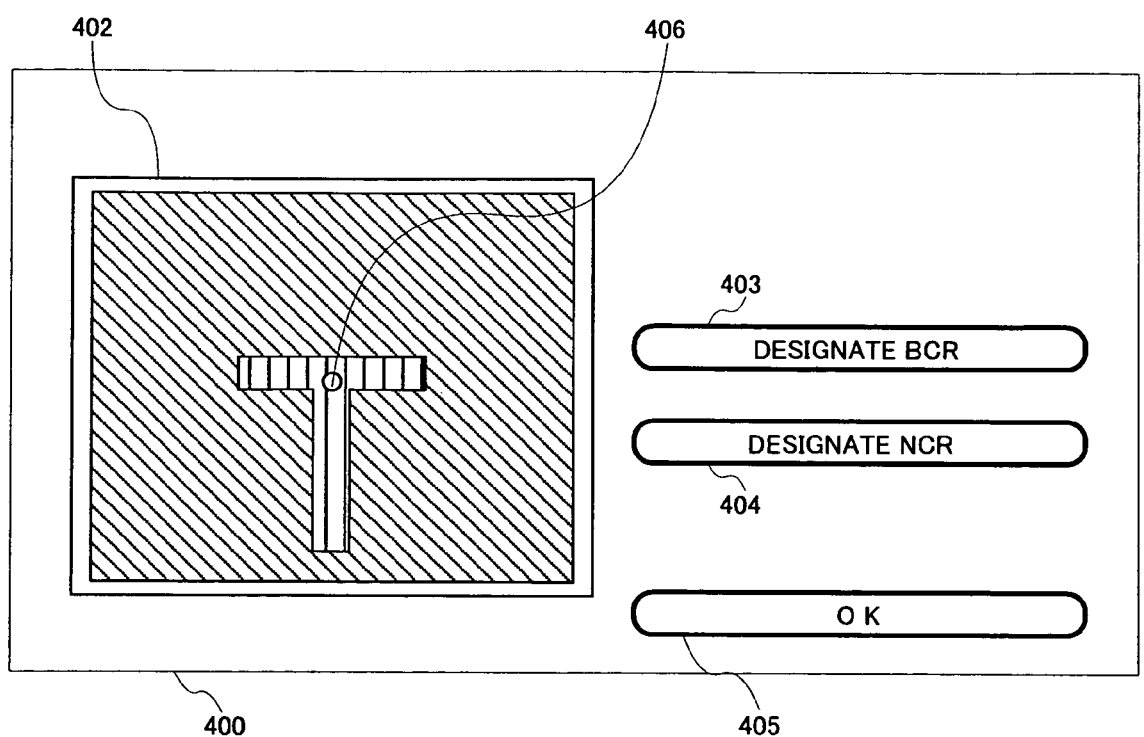
FIG. 6 is an explanatory diagram of a user interface screen of the operation panel according to the first disclosed embodiment.

An example of the screen of the user interface 400 in the operation panel 102 is described here with reference to FIG. 6. In particular, FIG. 6 is an explanatory diagram of a user interface screen of the operation panel in the first disclosed embodiment.

As shown FIG. 6, the user interface 400 includes a scanned image displaying unit 402, a BCR designation button 403, an NCR designation button 404, an OK button 405, and a designated color region frame 406. The scanned image displaying unit 402 displays the image data stored in the image memory unit 203; the BCR designation button 403 designates the BCR; the NCR designation button 404 designates the NCR; the OK button 405 informs the scanner 101 that the designations of each color regions are completed; and the designated color region frame 406 indicates a range of each color region designation within the scanned image displaying unit 402.

(S502) Returning to the description of FIG. 5, the user designates and the user interface accepts a BCR designation for the image. In the disclosed embodiments, this can be accomplished by having the user watch the screen of the user interface 400. The method of designating the BCR is described hereinafter. At first, the user watches a scanned image displayed on the scanned image displaying unit 402, and touches the BCR image on the screen, for example, using a LCD touch pen. The designated color region frame 406 is displayed on the screen. Next, the BCR is registered and the designated color region frame 406 is made to disappear from the screen by holding down the BCR designation button 403 on the screen.

(S503) The user designates and the user interface accepts an NCR designation for the image. In the disclosed embodiments, this can be accomplished by having the user watch the screen displayed on the user interface 400, and designate the NCR in the same manner as the BCR was designated above. In this case, the NCR is registered and the designated color region frame 406 is made to disappear from the screen by holding down the NCR designation button 404. The registration becomes final when the user holds down the OK button 405 on the screen of the user interface 400 after completing the registrations of the BCR and the NCR.

(S504) The system then derives a cumulative appearance ratio of luminance values within the BCR. In the disclosed embodiment, this can be achieved by having the BCR/NCR designating unit 204 provide positional information of the BCR to the BET value deriving unit 205 in the scanner 101 after completing the registration of the BCR and the NCR. The BET value deriving unit 205 in turn analyzes a luminance of all of the pixels within the designated BCR from the image data provided from the image memory unit 203 and the positional information of the BCR.

In particular, the BET value deriving unit 205 first calculates an appearance frequency $P_1(L)$ (%) of a given luminance value L (e.g., 0 to 255 for an 8-bit luminance value L) of all pixels within the designated frame in the BCR. The appearance frequency of the luminance value L indicates a proportion of pixels that have a luminance value L (i.e., the number of pixels having the luminance value L divided by the total number of pixels within the designated frame).

After that, the BET value deriving unit 205 calculates a cumulative appearance frequency $CP_1(L_i)$ (%) from the calculated appearance frequency $P_1(L)$.

The cumulative appearance frequency $CP_1(L_i)$ in the BCR is expressed Equation (1):

$$CP_1(L_i) = \sum_{L=0}^{L_i} P_1(L) \tag{1}$$

(S505) The system then derives a cumulative appearance ratio of a luminance value within the BCR. In the disclosed embodiment, this can be achieved by having the BCR/NCR designating unit 204 of the operation panel 102 inform the positional information of the NCR to the BET value deriving unit 205 of the scanner 101. The BET value deriving unit 205 then analyzes color information of all pixels within the designated frame using the image data that is already obtained and the positional information of the NCR.

The BET value deriving unit 205 calculates an appearance frequency $P_2(L)$ (%) of the luminance value L (e.g., 0 to 255) of all pixels within the designated frame in the NCR. After that, the BET value deriving unit 205 calculates the cumulative appearance frequency $CP_2(L_i)$ (%) from the calculated appearance frequency $P_2(L)$.

The cumulative appearance frequency $CP_2(L_i)$ in the NCR is expressed by Equation (2):

$$CP_2(L_i) = \sum_{L=0}^{L_i} P_2(L) \tag{2}$$

(S506) The system then calculates a modified luminance value L' that minimizes a first difference value $B(L_i)$. In the disclosed embodiments, the BET value deriving unit 205, which calculated the cumulative appearance frequency $CP_1(L_i)$ in the BCR and the cumulative appearance frequency $CP_2(L_i)$ in the NCR, can calculate the modified luminance value L' that minimizes the value of $B(L_i)$. The value of $B(L_i)$ falls within the possible luminance values L (e.g., 0 to 255), and is determined by Equation (3):

$$B(Li) = 100 - CP_2(Li) + CP_1(Li) \tag{3}$$

In Equation (3), a calculation of the modified luminance value L' that minimizes the first difference value $B(L_i)$ indicates an extraction of the modified luminance value L' for which there are many pixels of the NCR when the luminance value is at L' or less, and there are many pixels of the BCR when the luminance value is at L' and above.

In the disclosed first embodiment, for example, when $B(L_i)$ is more than 10 (i.e., $B(L_i)>10$), the images are judged as inseparable since the pixels of the BCR and the NCR have many pixels with common color information.

(S507) The BET value deriving unit 205 then judges whether the first $B(L_i)$ is below a set threshold (e.g., 10 in the disclosed embodiment). When it is below the threshold, operation proceeds to S512; and when it is equal to or more than the threshold, operation proceeds to S508.

(S508) If $B(L_i)$ is equal to or greater than the threshold value, the BET value deriving unit 205 judges that the BCR and the NCR are inseparable since the BCR and the NCR have many pixels that have common color information, and detects minimal $L_1$ in the luminance of the pixels within the BCR. In this regard, $L_1$ is a minimal value that satisfies $CP_1(L_1) \geq thcp_1$ (for example, $thcp_1 = 5\%$) by considering noise and the like.

(S509) The BET value deriving unit 205 then provides the minimal luminance value $L_1$ of the pixel within the BCR to the BEP registering unit 207, and the BEP registering unit 207 registers the value $L_1$ as a BET value.

(S510) Next, the NJE deriving unit 206 extracts a hue data range ($H_{2-min}$, $H_{2-max}$), a saturation data range ($S_{2-min}$, $S_{2-max}$), and a luminance data range ($L_{2-min}$, $L_{2-max}$) of the pixels within the designated NCR so as not to eliminate the pixels within the NCR that are inseparable.

An extraction of the above data, $H_{2-min}$, $H_{2-max}$, $S_{2-min}$, $S_{2-max}$, $L_{2-min}$, and $L_{2-max}$, is described here.

The hue data range of the pixels within the NCR is as follows. $H_{2-min}$ is a minimal value that satisfies $CPH_2(L) \geq thcph_2$ (for example, $thcph_2 = 5\%$) by considering noise and the like. Also, $H_{2-max}$ is a maximal value that satisfies $CPH_2(L) \leq thcph_2$ (for example, $thcph_2 = 95\%$) by considering noise and the like.

The saturation data range of the pixels within the NCR is as follows. $S_{2-min}$ is a miniimal value that satisfies $CPS_2(L) \geq thcpc_2$ (for example, $thcpc_2 = 5\%$) by considering noise and the like. Also, $S_{2-max}$ is a maximal value that satisfies $CPS_2(L) \leq thcpc_2$ (for example, $thcpc_2 = 95\%$) by considering noise and the like.

The luminance data range of the pixels within the NCR is as follows. $L_{2-min}$ is a minimal value that satisfies $CP_2(L) \geq thcp_2$ (for example, $thcp_2 = 5\%$) by considering noise and the like. Also, $L_{2-max}$ is a maximal value that satisfies $CP_2(L) \leq thcp_2$ (for example, $thcp_2 = 95\%$) by considering noise and the like.

(S511) After extracting the hue data range ($H_{2-min}$, $H_{2-max}$), the luminance data range ($L_{2-min}$, $L_{2-max}$), and the saturation data range ($S_{2-min}$, $S_{2-max}$) of the pixels within the designated NCR, the NJE deriving unit 206 registers an NJE with the BEP registering unit 207 according to Equations (4).

$$(L_{2\text{-}min} \leq L \leq L_{2\text{-}max}) \text{ AND } (S_{2\text{-}min} \leq S \leq S_{2\text{-}max}) \text{ AND}$$
$$(H_{2\text{-}min} \leq H \leq H_{2\text{-}max}) \quad (4)$$

(S512) However, when the comparison in S507 determines that $B(L_j)$ is less than the threshold value (i.e., $B(L_j)<10$ in the disclosed embodiment), a luminance value L' that can separate the BCR and the NCR is calculated at S507, the BEP then registering unit 207 registers the luminance value L' as a BET value.

Figure 7:
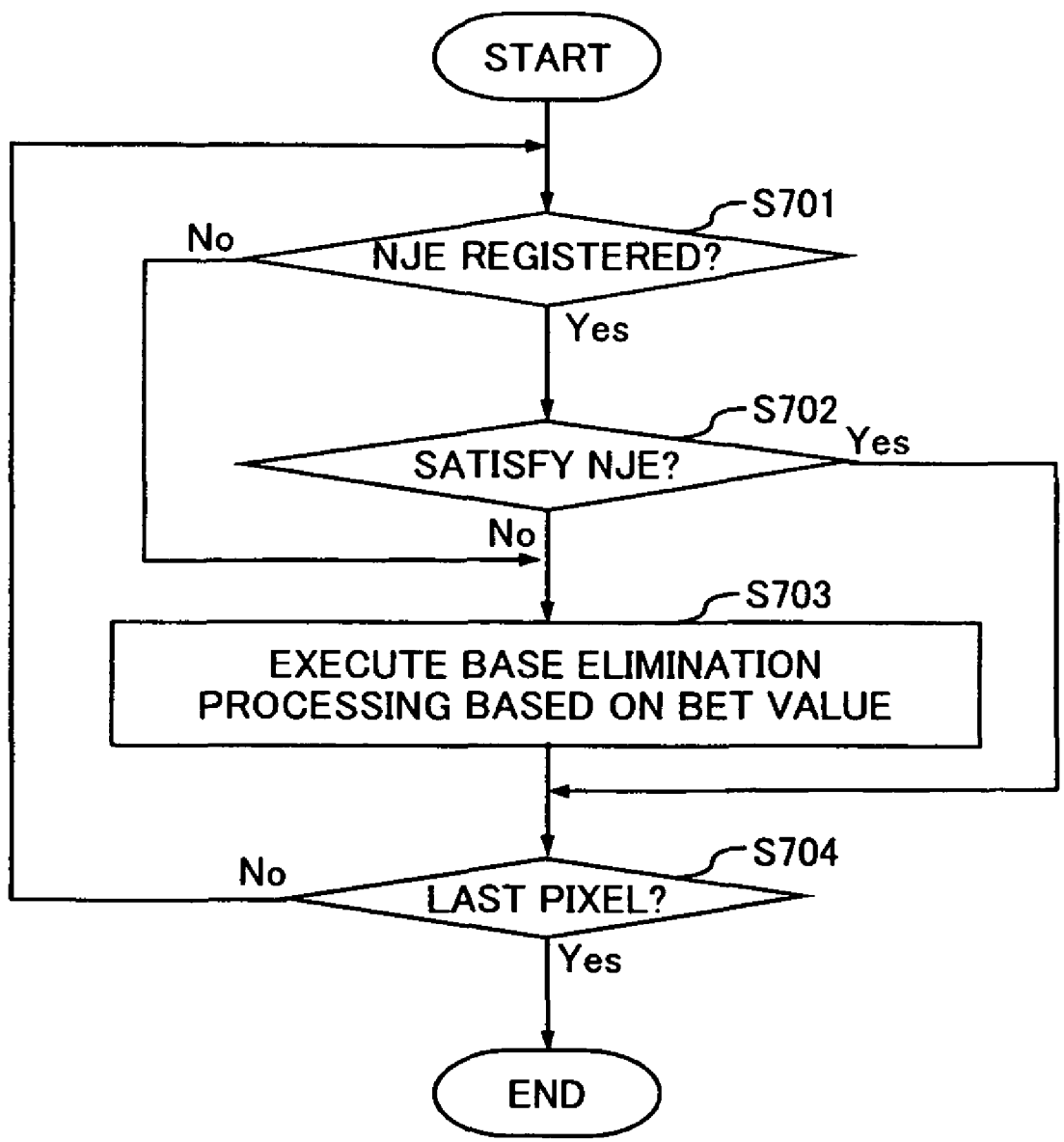
FIG. 7 is a flow diagram showing a flow of base elimination processing according to the first disclosed embodiment.

Following this, a processing flow of a base elimination for each pixel in the whole region of an image is described. FIG. 7 is a flow diagram showing a flow of base elimination processing according to the first disclosed embodiment. It can be performed using the system of the first disclosed embodiment, as shown in FIG. 1.

(S701) In the method of FIG. 7, the base elimination processing unit 208 chooses a predetermined pixel of an image data stored in the image memory unit 203 and analyzes whether it needs a base elimination processing. At first, the base elimination processing unit 208 checks whether the NJE mentioned above is registered or not in the BEP registering unit 207. When it is registered, proceed to S702, and when it is not registered, it proceeds to S703.

(S702) When it is determined that the NJE is registered (S701), the base elimination processing unit 208 then determines whether the color information of the chosen pixel is within the color information range of the registered NJE. The base elimination processing unit 208 proceeds to S704 when color information of the chosen pixel is within the color information range of the registered NJE, and proceeds to S703 when it is outside the range.

(S703) When it is determined that the NJE is not registered (S701), or it is determined that the color information of the chosen pixel is outside the color information range of the registered NJE (S702), the base elimination processing unit 208 executes the base elimination processing for the luminance of the chosen pixel based on the BET value registered in the BEP registering unit 207.

Figure 8:
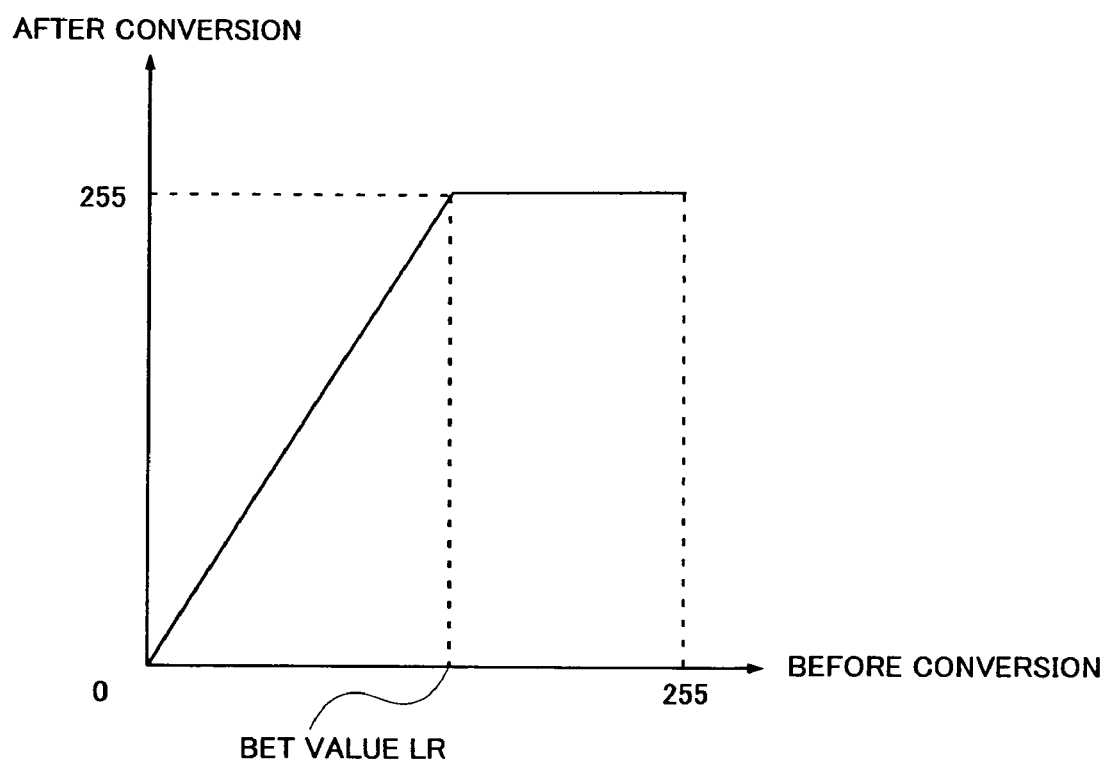
FIG. 8 is an explanatory diagram of a conversion function for base elimination processing according to the first disclosed embodiment.

Here, a conversion function to execute the base elimination processing is described with respect to FIG. 8. In particular, FIG. 8 is an explanatory diagram of conversion function for the base elimination processing in the disclosed first embodiment. As shown in FIG. 8, the luminance value L of the chosen pixel is converted by the conversion function based on the BET value $L_R$.

The above conversion function is expressed by Equation (5):

$$y(L) = \begin{cases} 255 & (L \geq L_R) \\ \dfrac{255}{L_R} \cdot L & (0 \leq L < L_R) \end{cases} \quad (5)$$

By this conversion function, the chosen pixel is converted into the luminance value 255 when the luminance of the pixel is the BET value $L_R$ and above, and so becomes white. Also, the luminance of the pixel is corrected to be a brighter luminance in accordance with Equation (5) when the luminance of the pixel is less than the BET value $L_R$. Therefore, the luminance of the base and the luminance of the pixels on the manuscript can keep continuity while eliminating the base using the present conversion function.

(S704) When it is determined that the color information of the chosen pixel is within the color information range of the registered NJE (S702), the base elimination processing unit 208 converts the luminance value of the chosen pixel by the conversion function, and judges whether it is the last pixel or not within the image. It ends the processing when it is the last pixel, and it returns to S701 and executes the processing for the next pixel when it is not the last pixel.

In addition, although the base elimination processing is executed for the pixel other than non-base pixels using Equation (5) by judging the non-base pixels from the hue, the luminance, and the saturation of the designated BCR and NCR, the base elimination processing may be executed only for a base pixel using Equation (5) by judging the base pixel from the hue, the luminance, and the saturation of the designated BCR. In this case, the pixel of the designated NCR and that of the other manuscript can also keep continuity in luminance, similar to the present embodiment.

Second Disclosed Embodiment

The present embodiment can reproduce a manuscript while eliminating a BCR in the manuscript and keeping a relation between a luminance of designated NCR in the original manuscript and a luminance of the others by converting the pixel, that has the same value as the hue, the luminance, and the saturation of the designated NCR, and the other pixel using different conversion functions when there is no BET value that can separate the designated BCR and NCR.

Figure 9:
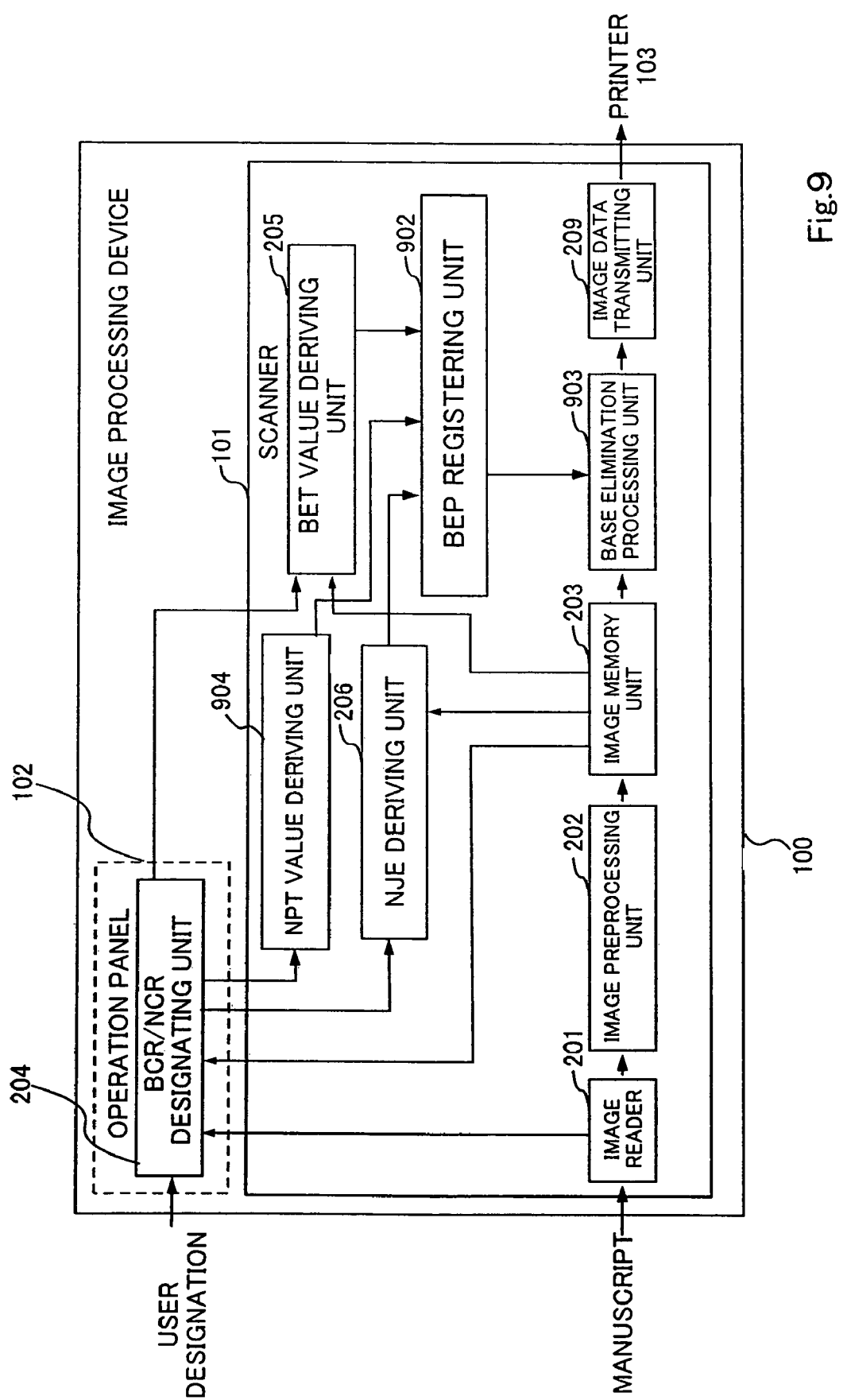
FIG. 9 is a block diagram showing a configuration of the image processing device according to a second disclosed embodiment.

Next, a configuration of the image processing device 100 of FIG. 1 according to a second disclosed embodiment is described. FIG. 9 is a block diagram showing the configuration of the image processing device related to the second disclosed embodiment.

As shown in the figure, the scanner 101 includes an image reader 201, an image preprocessing unit 202, an image memory unit 203, a BET value deriving unit 205, a NJE deriving unit 206, a non-base pixel threshold (NPT) value deriving unit 904, a BEP registering unit 902, a base elimination processing unit 903, and an image data transmitting unit 209. The operation panel 102 includes a BCR/NCR designating unit 204. Only a part that is different from the first disclosed embodiment is described in detail below. The description of the configuration that is similar to the first disclosed embodiment is omitted by assigning the same reference numbers to corresponding elements.

The NPT value deriving unit 904 extracts a luminance conversion threshold value for a pixel judged as non-base from a luminance frequency distribution of a NCR (a NPT value) designated by a user. The BEP registering unit 902 registers the NPT value mentioned above in addition to a BET value and a NJE derived at the BET value deriving unit 205 and the NJE deriving unit 206. The base elimination processing unit 903 executes a base elimination processing for an image data stored in the image memory unit 203 using a BEP (a BET value, a NJE and a NPT) registered in the BEP registering unit 902.

Figure 10:
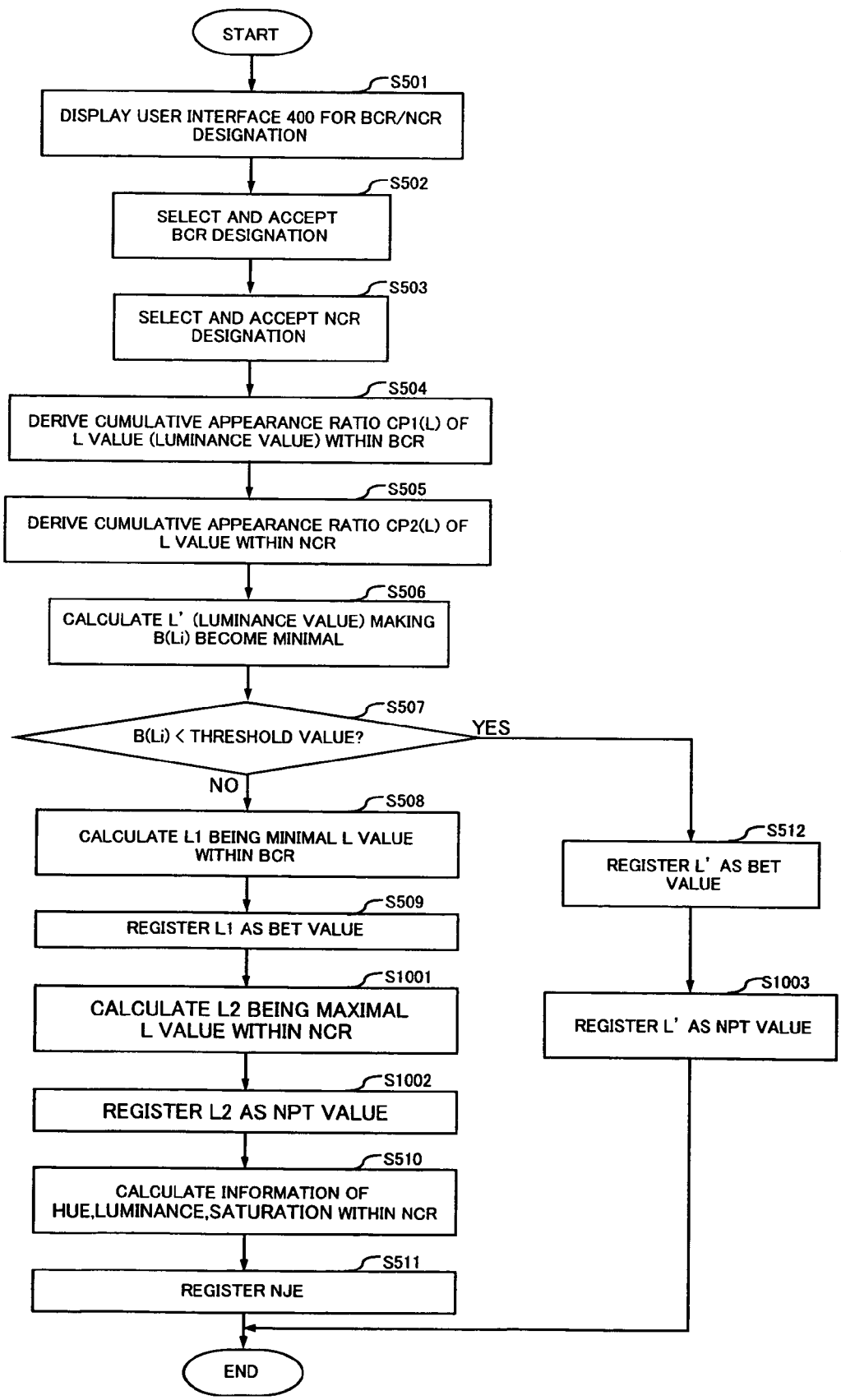
FIG. 10 is a flow diagram showing a processing flow of BEP registration according to the second disclosed embodiment.

Following this, a registration processing of the BEP including the NPT value added in the second disclosed embodiment is described. FIG. 10 is a flow diagram showing a processing flow of BEP registration according to the second disclosed embodiment.

In FIG. 10, similar operations use the same reference numbers as in FIG. 5, and operations S1001 to S1003 are newly added. Therefore, only elements S1001 to S1003 that were added are described below.

(S1001) The NPT value deriving unit 904 detects maximal luminance value L2 that appears in the designated NCR. In this regard, L2 is a maximal value that satisfies CP2(L2) ≦thcp2 (for example, thcp2=95%) by considering noise and the like.

(S1002) The BEP registering unit 902 then registers the detected $L_2$ as the NPT value.

(S1003) On the other hand, when a luminance value L that can separate the BCR and the NCR is calculated at S512, in this embodiment the BEP registering unit 902 registers the detected L' as a NPT value as well as a BET value.

Figure 11:
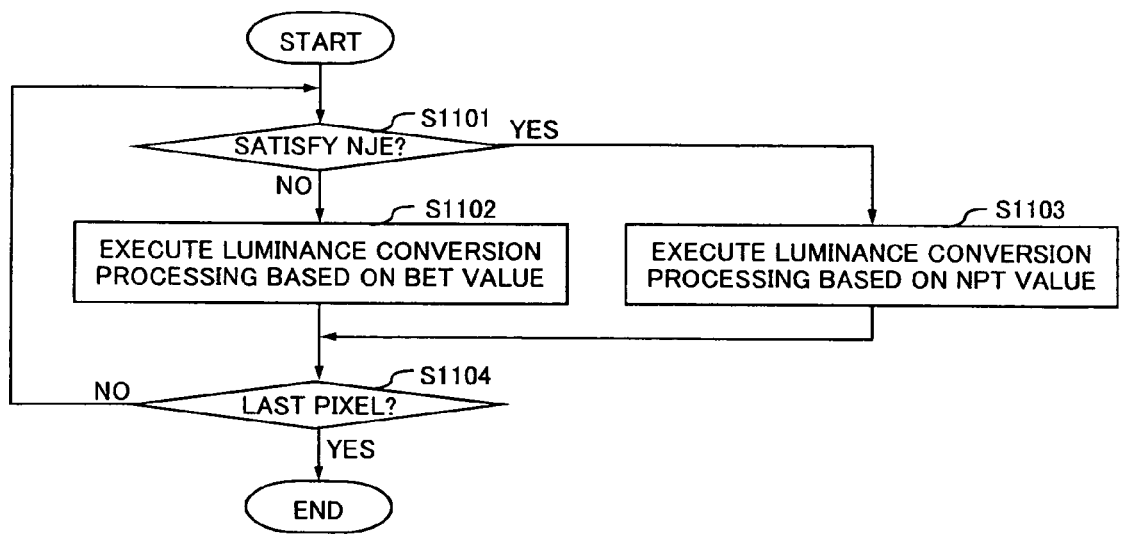
FIG. 11 is a flow diagram showing a flow of base elimination processing according to the second disclosed embodiment.

Following this, a processing flow of a base elimination for each pixel in the whole region of an image according to the second disclosed embodiment is described. FIG. 11 is a flow diagram showing a flow of base elimination processing in the second disclosed embodiment. Operations S1101 to S1104 are described in order, according to the flow diagram shown in FIG. 11, and in accordance with the flow diagram of FIG. 9.

(S1101) The base elimination processing unit 903 begins by choosing a predetermined pixel in an image data stored in the image memory unit 203 and determining whether or not the color information of the chosen pixel is within the color information range of the registered NJE.

(S1102) When the color information of the chosen pixel is determined to be outside the set range (S1101), the base elimination processing unit 903 executes a base elimination processing based on the BET value registered in the BEP registering unit 902. The conversion function that executes the base elimination processing here is same as Equation (5) mentioned above. Therefore, as for the BCR, a luminance value L of a pixel is converted using the BET value $L_R$.

(S1103) When color information of the chosen pixel is within the color information range of the registered NJE, the base elimination processing unit 903 executes a luminance conversion processing based on a NPT value registered in the BEP registering unit 902.

Figure 12:
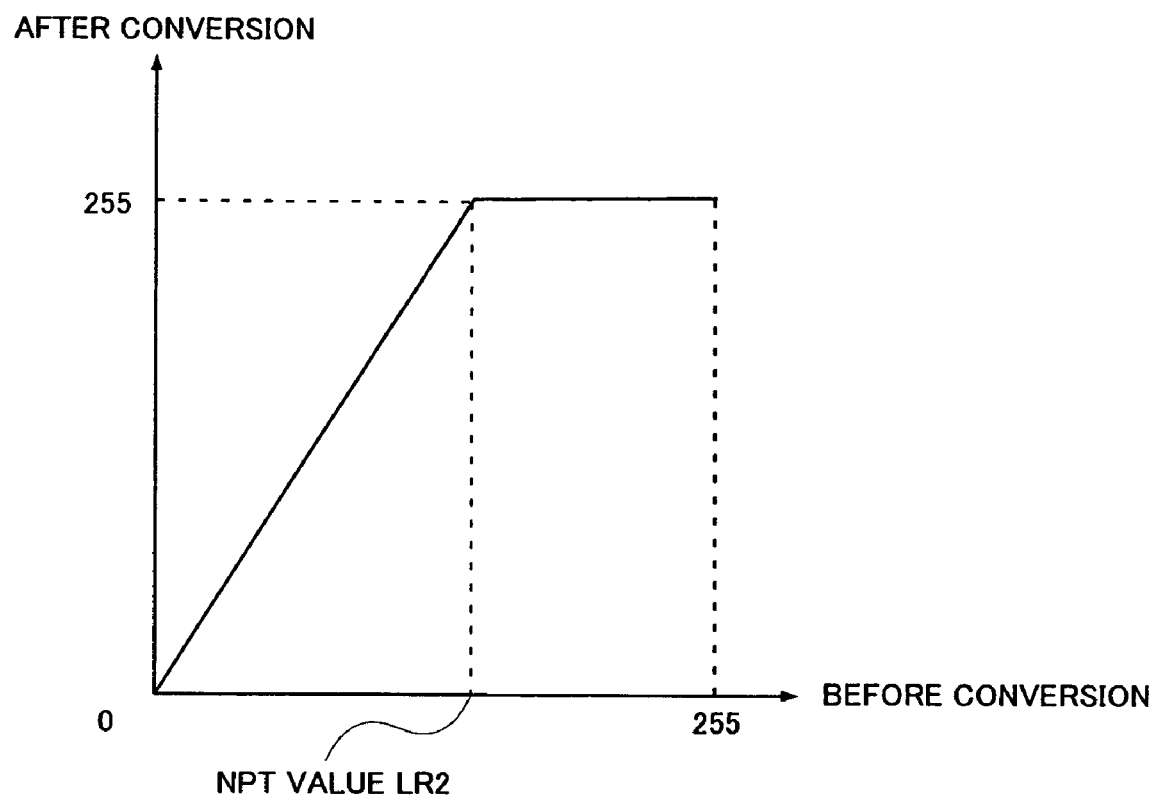
FIG. 12 is an explanatory diagram of a luminance conversion function to non-base pixels according to the second disclosed embodiment.

FIG. 12 is an explanatory diagram of luminance conversion function to non-base pixels in the second disclosed embodiment. As shown in FIG. 12, a pixel in NCR is converted by a luminance conversion function, and the function is expressed by Equation (6):

$$y(L) = \begin{cases} 255 & (L \geq L_{R2}) \\ \dfrac{255}{L_{R2}} \cdot L & (0 \leq L < L_{R2}) \end{cases} \quad (6)$$

In this equation, $L_{R2}$ is a NPT value. By using the conversion function, the closer the NPT value gets to the BET value $L_R$ from 255, the closer the result can be obtained to a conversion result using Equation (5). Therefore, there is a reversal phenomenon in a pixel and a luminance in NCR, such that, for example, when a luminance of NCR in an original manuscript is higher than a luminance of the other part, the luminance of the other part becomes high because of the base elimination. This can be prevented by also converting the NCR using Equation (6) in the second disclosed embodiment, rather than only converting the BCR.

(S1104) Once the luminance conversion is performed (in either S1102 or S1103), the base elimination processing unit 903 converts the luminance value of the chosen pixel by the conversion function, and judges whether it is the last pixel or not within the image. It ends the processing when it is the last pixel, and it returns to S1101 and executes the processing for the next pixel when it is not the last pixel.

As mentioned above, the second disclosed embodiment can reproduce a manuscript while eliminating a BCR in the manuscript and keeping a relation between a luminance of designated NCR in the original manuscript and a luminance of the others by converting a pixel, that has the same value as the hue, the luminance, and the saturation of the designated NCR, and the other pixel using different conversion functions when there is no BET value that can separate the designated BCR and NCR.

In addition, although the present embodiment is described by using a scanner and an operation panel, in alternate embodiments it may be performed in a complex machine including a scanner, an operation panel, and a printer.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An image processing device comprising:
a displaying unit that reads an image that was scanned from an original and forms the image of the original on the displaying unit;
a base color region designator that interacts with a user to select a base color region of the image displayed on the displaying unit;
a non-base color region designator that interacts with a user to select a non-base color region of the image displayed on the displaying unit; and
a base eliminator that executes a base elimination of the image based on the base color region selected by the base color region designator and the non-base color region selected by the non-base color region designator, wherein
the base eliminator comprises a non-base judging equation deriving unit that uses a judging equation to judge whether or not a predetermined pixel is a non-base pixel,
the non-base judging equation deriving unit derives the judging equation based on color information of all of the pixels not outside the non-base color region.

2. The image processing device of claim 1, wherein
the base eliminator comprises a threshold value deriver that determines a base elimination threshold value based on first color information of the base color region and second color information of the non-base color region, and wherein
the base eliminator executes the base elimination of the image by using the base elimination threshold value determined by the threshold value deriver.

3. The image processing device of claim 2, wherein
the threshold value deriver calculates a luminance frequency distribution based on luminance values of all pixels not outside the base color region and the non-base color region, and wherein the threshold value deriver calculates the base elimination threshold value based on distribution values of the luminance frequency distribution.

4. The image processing device of claim 2, wherein
the threshold value deriver judges whether or not a predetermined pixel of the image is a base pixel in the image based on one of: the color information of the base color region, and the color information of the non-color region.

5. The image processing device of claim 1, wherein
the non-base judging equation deriving unit derives the judging equation based on a hue range, a saturation range, and a luminance range of the pixels not outside the non-base color region, and
the color information are composed of data regarding at least one of a hue, a saturation, and/or a luminance.

6. The image processing device of claim 1, wherein
the base eliminator extracts the color information of the base color region and the color information of non-base color region, and the color information are composed of data regarding a hue, a saturation, and/or a luminance.

7. The image processing device of claim 1, wherein
the base eliminator executes the base elimination with respect to one of pixels that do not have color information in the non-base color region, or pixels that have color information in the base color region.

8. The image processing device of claim 1, wherein
the base eliminator extracts base color information of the base color region and non-base color information of the non-base color region,
the base color information includes data regarding at least one of a first hue, a first saturation, and a first luminance of the base color region, and
the non-base color information includes data regarding at least one of a second hue, a second saturation, and a second luminance of the non-base color region.

9. The image processing device of claim 1, wherein a user interface provides a frame that is manipulated by the user on the image of the original on the displaying unit to first enclose in the frame a first part of the image having a range of color to be included in the base color region and to second enclose in the frame a different part of the image having a range of color to be included in the non-base color region.

10. The image processing device of claim 9, the frame having a predetermined shape.

11. The image processing device of claim 9 wherein the user interface further interacts with the user to specifically indicate that the base color region and the non-base color regions are accepted, before the base eliminator executes the base elimination.

12. A system for processing an image, comprising:
an image reader configured to generate image data based on an image that was scanned from an original;
an input/output device configured to display the image that was scanned from the original based on the image data, that interacts with a user to first select a base color region in the image that is displayed, and that interacts with the user to second select a non-base color region in the image that is displayed; and
an image processor configured to receive the image data, to identify the base color region based on the user's first selection, to identify the non-base color region based on the user's second selection, and to generate a base elimination threshold based on the image data, information regarding the base color region, and information regarding the non-base color region, wherein
the image processor uses a judging equation to judge whether or not a predetermined pixel is a non-base pixel,
the image processor derives the judging equation based on at least one of color information of all of the pixels not outside the non-base color region.

13. The system for processing an image of claim 12, wherein
the input/output device includes a liquid crystal display configured to display the image, and a touch pen configured to select portions of the image.

14. The system for processing an image of claim 12, wherein
the information regarding the base color region includes information relating to at least hue, saturation, or luminescence of the base color region, and
the information regarding the non-base color region includes information relating to at least hue, saturation, or luminescence of the non-base color region.

15. The system for processing an image of claim 12, wherein
the image processor is further configured to generate the base elimination threshold as a function of a base cumulative appearance ratio of luminescence values of the base color region and a non-base cumulative appearance ratio of luminescence values of the non-base color region.

16. The system for processing an image of claim 12, wherein a user interface provides a frame that is manipulated by the user on the image of the original on the displaying unit to first enclose in the frame a first part of the image having a range of color to be included in the base color region and to second enclose in the frame a different part of the image having a range of color to be included in the non-base color region.

17. The system for processing an image of claim 16, the frame having a predetermined shape.

18. The system for processing an image of claim 16 wherein the user interface further interacts with the user to specifically indicate that the base color region and the non-base color regions are accepted, before the base eliminator executes the base elimination.

* * * * *